June 18, 1968 D. E. HUGHES 3,389,055
JET PUMP ASSEMBLY IN A NUCLEAR REACTOR
Filed April 5, 1965 4 Sheets-Sheet 4

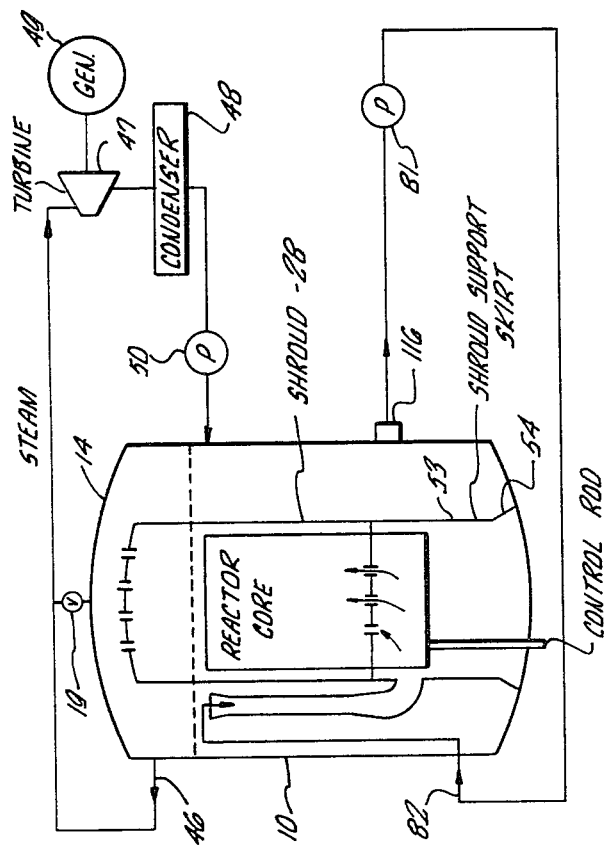
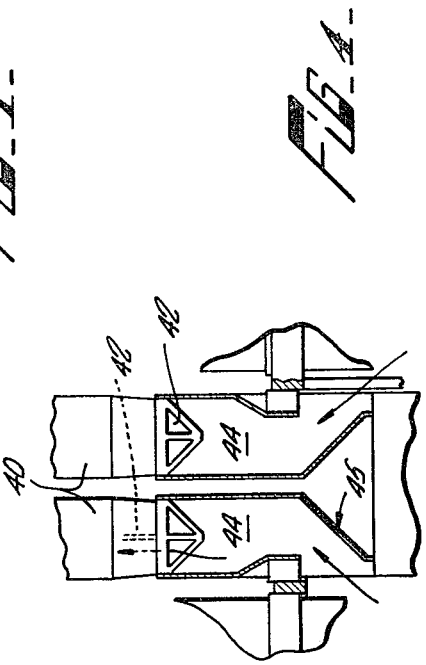
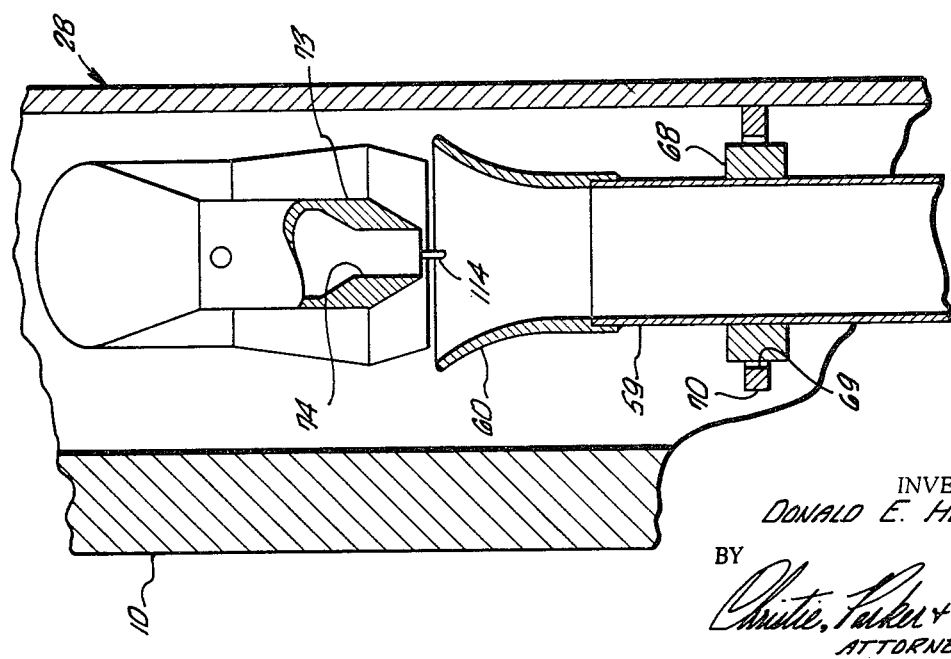

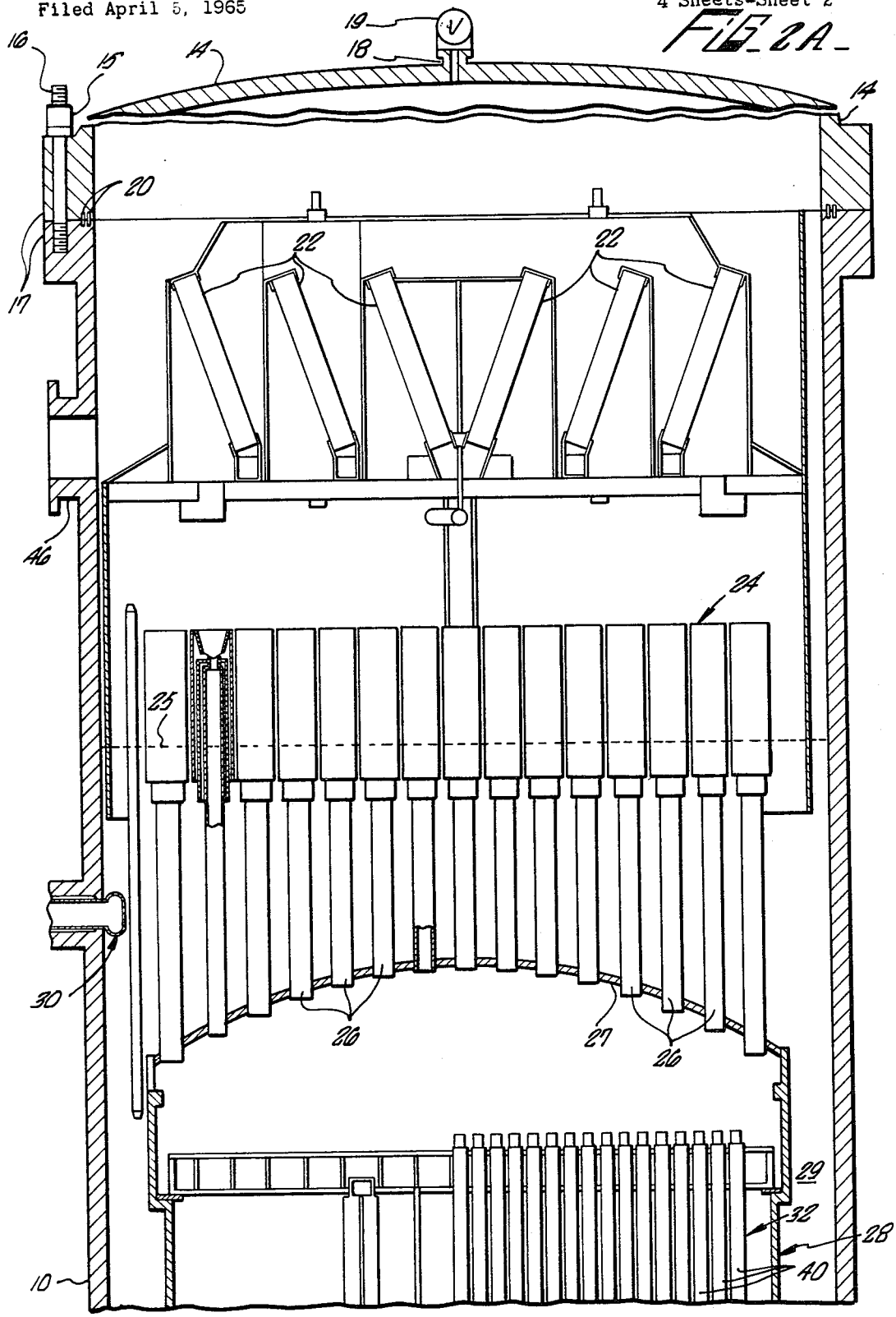

INVENTOR.
DONALD E. HUGHES
BY
ATTORNEYS

United States Patent Office 3,389,055
Patented June 18, 1968

3,389,055
JET PUMP ASSEMBLY IN A
NUCLEAR REACTOR
Donald E. Hughes, San Jose, Calif., assignor to General
Electric Company, New York, N.Y., a corporation of
New York
Filed Apr. 5, 1965, Ser. No. 445,383
7 Claims. (Cl. 176—61)

ABSTRACT OF THE DISCLOSURE

The invention relates to a system of jet pumps for circulating a cooling fluid such as water through a nuclear reactor core contained within a pressure vessel. The jet pumps are located in the downcomer annulus between a shroud surrounding the core and the interior of the pressure vessel whereby the coolant is forced downward into the inlet end or bottom of the core. The nozzles of the pumps are supplied with driving fluid via a distributor near the bottom of the vessel and riser pipes extending upward adjacent the pumps. The jet pump nozzles are supported by an adjacent riser pipe and each nozzle is formed with wings for engaging the respective pump inlet. Each pump body is formed with a slip joint to permit ready removability of the upper or mixer section of the pump. The pump body has a higher thermal coefficient of expansion than the riser pipes whereby the nozzle wings and pump inlet and the slip joint are more firmly forced together with an increase in temperature.

---

The general pumping system to which the invention pertains is disclosed and claimed in a copending application, entitled "Pumping," Ser. No. 445,382, filed on even date herewith by John M. Roberts. The present invention relates to the use of pump body and riser pipe materials of different thermal coefficients of temperature to minimize thermal expansion problems.

A conventional jet pump includes a body with three distinct regions, namely, an inlet or suction section, a throat or a mixing chamber of substantially uniform cross-sectional area throughout its length, and a diffuser which increases in cross-sectional area in the direction of flow. A nozzle is positioned in the inlet section to convert a high-pressure stream of driving fluid into a high-velocity, low-pressure jet of driving fluid which flows coaxially through the inlet section and into the mixing chamber. The high-velocity jet is at a much lower pressure than fluid surrounding the nozzle in the vicinity of the inlet section so driven fluid is sucked into the pump inlet by the jet. A converging housing on the inlet section and surrounding the nozzle directs the driven fluid or suction flow into the mixing chamber. Within the mixing chamber, the high-velocity jet of driving fluid gradually widens as an entrainment-mixing process takes place with the driven fluid or suction stream. The mixing transfers momentum from the jet driving stream to the driven suction stream, so static pressure in the combined stream rises. In theory, the mixing chamber ends after a uniform velocity profile is achieved, and this usually occurs shortly after the widening driving jet stream touches the mixing chamber walls. From the relatively small cross-sectional area mixing chamber, the merged driving and driven fluids flow into the diffuser of increasing cross section in the direction of flow, further increasing pump discharge pressure as the velocity of the merged fluids is reduced to convert the maximum amount of velocity head to static head or pressure.

Since the jet pump has no mechanical moving parts, it is well suited for forced circulation of coolant, say, water, in a boiling water nuclear reactor where long and trouble-free operation is required because of the high radioactivity, making pump repair or replacement difficult and expensive.

Unfortunately, jet pumps are not inherently efficient, and their efficiency decreases further if there is not accurate alignment of the nozzle and the pump inlet. Since jet pumps in a nuclear reactor normally are assembled under ambient or relatively cool conditions, and then operated at relatively high temperatures and high flow rates, the resulting mechanical and thermal stresses make accurate alignment under operating conditions difficult.

Jet pumps have been used in nuclear reactors before (for example, see U.S. Patents Nos. 2,861,033 and 3,087,-881), but their design and arrangement have not been efficient, and have not been conducive to easy maintenance, repair, or replacement.

This invention provides an improved jet pump arrangement which improves pumping efficiency and insures good alignment between the nozzle and pump inlet over a wide range of operating temperatures. Moreover, the arrangement of the pump of this invention is such that the nozzle and pump inlet, which are the elements subject to the most wear, can be easily and quickly removed and replaced, say, during normal refueling, which minimizes shut-down time and radiation hazards to maintenance personnel. The pump body is made of two sections which make a slip fit together at the inlet end of the diffuser section, i.e., where wear due to high flow rate is substantially reduced.

In terms of heat-generating apparatus, the invention includes a nuclear chain reacting core having an inlet end and outlet end through which a fluid coolant such as water flows to be heated. Ordinarily, the core is made up of a plurality of fuel bundles or assemblies, each bundle having a tubular channel to direct fluid flow through it. A jet pump body has its discharge connected to open into the core inlet. The pump body extends from its discharge end toward the core outlet and terminates at a pump inlet. A nozzle is mounted to direct a jet of driving fluid into the pump inlet. A distributor is connected to the nozzle and spaced from the nozzle in a direction toward the core inlet, and means are provided for delivering fluid to the distributor and nozzle under pressure. Preferably, the driving fluid is picked up at a location spaced from the jet pump inlet and displaced toward the pump outlet so there is a general flow of the fluid toward the pump inlet.

Ordinarily, the nuclear chain reactor core, jet pump body, nozzle, and distributor are mounted in a pressure vessel which holds a supply of water that is converted into steam, extracting heat from the reacting core. The core inlet is usually below the core outlet, and the jet pump body is normally upright. With this arrangement, the diffuser is spaced below the jet pump inlet and nozzle. The pressure vessel can be opened from its top so that the jet pump inlet and nozzle are easily reached for replacement when necessary. Preferably, the nozzle, the jet pump inlet section, and the throat or mixing chamber are releasably attached to the diffuser so that these elements which are subject to the most wear can readily be reached and replaced. Since the distributor is located below the jet pump inlet and nozzle, it does not have to be removed in replacing the jet pump nozzle or inlet. Moreover, the distributor is not subject to excessive wear, and it can be made a permanent part of the pressure vessel internal structure.

Preferably, the distributor is connected by a riser or supply pipe to the nozzle, and the riser is approximately the same effective length as the jet pump body to minimize expansion problems when the reactor is heated and cooled. The distributor and jet pump body are preferably attached to the pressure vessel at adjacent locations to minimize thermal expansion problems.

In the presently preferred embodiment of the invention, a plurality of jet pump bodies and respective nozzles are mounted in the pressure vessel in a downcomer annulus formed between the exterior of the core and the interior of the pressure vessel.

The upper portion of each jet pump body makes a slip fit with the lower portion so the upper portion, which wears faster, can be removed and replaced by simply sliding it out of position, thus avoiding having to break or make threaded connections at a considerable distance under water and adjacent a radioactive reactor core.

A pair of substantially horizontal and semi-annular distributors are mounted in the vessel just below the outlet of each jet pump. A separate riser extends upwardly from the distributors between separate pairs of jet pumps, and each riser carries a fitting at its upper end which directs fluid flow through a 180° turn and into two separate nozzles, each mounted over a respective pump inlet so that two jet pumps are supplied driving fluid by each riser.

Each pair of nozzles is removably secured to the upper end of their respective risers. Each nozzle carries a pair of outwardly extending wings which bear against the upper edge of the inlet of the respective jet pump served by the nozzle. Each jet pump body is made of a material which expands slightly faster with increasing temperature than the material used for the risers. The wings on each nozzle make a close fit on the jet pump inlet with respect to lateral dimensions, but a slightly loose fit in an axial direction. In a typical boiling water reactor operated at 1000 p.s.i., the temperature rises from ambient, say, 72° F. to about 550° F. When the reactor and water are brought up to operating temperature, the jet pump body expands slightly more than the riser to cause slip joint in the pump body to fit snugly together, and cause the nozzle wings to make a firm fit on the upper edge of each jet pump inlet and maintain good alignment between the nozzles and the jet pump inlets.

These and other aspects of the invention will be more fully understood from the following detailed description and the accompanying drawings, in which:

FIG. 1 is a schematic sectional elevation of a jet pump mounted in a nuclear reactor in accordance with this invention;

FIGS. 2A and 2B are detailed fragmentary sectional elevations, partly broken away, of the major components in the upper and lower portions, respectively, of the reactor shown in FIG. 1;

FIG. 3 is an enlarged view, partly broken away, taken within the area of line 3—3 of FIG. 2B;

FIG. 4 is an enlarged view, partly broken away, taken within the area of line 4—4 of FIG. 2B.

Figure 2B:
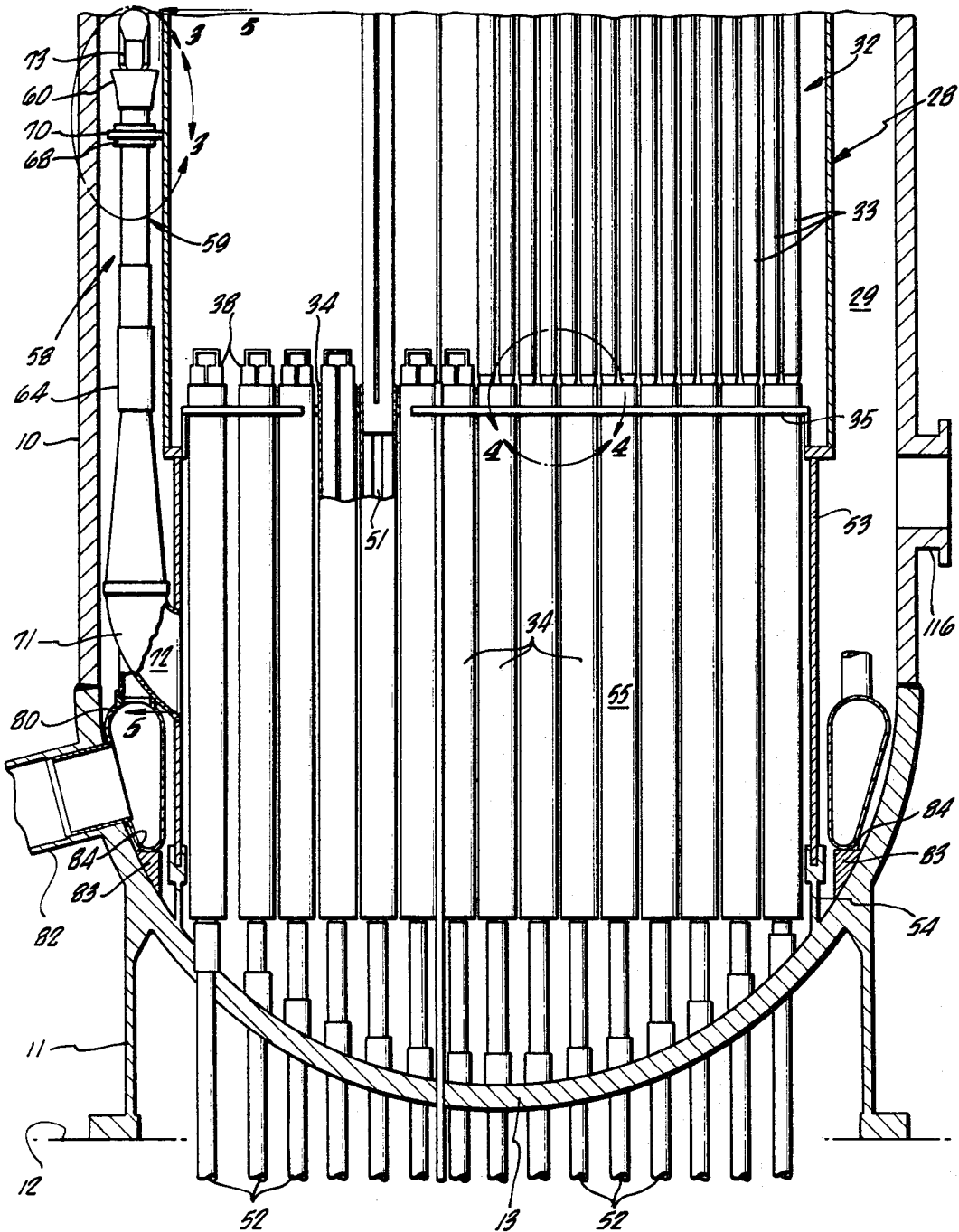

Referring to FIGS. 1, 2A and 2B, an upright cylindrical pressure vessel 10 has downwardly extending feet 11 which rest on a foundation 12. The lower end of the vessel is closed by a dish-shaped bottom head 13, and the upper end of the vessel is closed by a removable dome-shaped top head 14 secured to the upper end of the vessel by nuts 15 and stud bolts 16 attached to outwardly extending respective flanges 17 on the vessel and top head. A vent pipe 18 in the top head is normally closed by a valve 19. The top head is sealed by gaskets 20 to the upper end of the vessel to make a pressure-tight fit. Steam dryer panels 22, which may be of conventional type, are mounted in the upper end of the vessel, and are shown only schematically because they do not form any part of the present invention.

Steam separators 24, which also may be of conventional construction, are mounted in the vessel just below the steam dryer panels, and are shown only schematically because they form no part of the present invention.

Water is maintained in the vessel at a level about midway up the steam separators as indicated by the horizontal dashed line 25.

A separate vapor tube 26 extends down from each steam separator and is sealed through a steam plenum cap 27 of a cylindrical shroud 28 disposed coaxially within the pressure vessel to leave an upright space or downcomer annulus 29 between the shroud and the vessel wall. Feed water is supplied to the tank through four feed water sparger nozzles 30 (only one sparger nozzle is shown) located at equal intervals in a horizontal plane below the normal water level in the tank. A reactor core fuel assembly 32 is made up of a plurality of elongated vertical fuel assemblies 33. The fuel assemblies are arranged in groups of four, with the lower end of each fuel assembly in each group resting on a vertical respective control rod guide tube 34 sealed at its upper end through a horizontal bottom grid plate 35 mounted across the bottom of the shroud. Each guide tube 34 extends down below the bottom grid plate, and a separate control rod 38 is mounted in each control rod guide tube to slide longitudinally up and down between the four adjacent elongated vertical fuel assemblies 33 resting on the grid tube. Vertical flow channels 42 (see FIG. 4) extend through each vertical fuel assembly and open out the lower and upper ends of each fuel assembly. The lower end of each fuel channel is sealed in a respective water inlet opening 44 in a guide tube casting 45 so that water can flow upwardly through the fuel assemblies where water changes to steam, and then pass as a steam-water mixture out the vapor tubes and through the steam separators.

Water separated from the steam in the separators is returned to the downcomer annulus. Steam passes the steam drier panels, and leaves the vessel through a steam outlet 46 to pass through a conventional steam turbine 47 (FIG. 1) and condenser 48. The turbine drives an electric generator 49 to develop power from the heat generated in the reactor. Condensed steam is returned from the condenser to the feed water sparger nozzles by a conventional pump 50.

The control rods are moved into and out of the reactor core region by control rod drive pistons 51 which each extend through a respective vertical control rod drive thimble 52 sealed through the bottom of the vessel. The control rod drive pistons are operated by conventional equipment which is not shown since it forms no part of this invention.

The lower end of the shroud is welded to the upper end of a cylindrical shroud support skirt 53, the lower end of which is welded to an annular ring 54 formed integrally with the bottom head of the vessel. A core inlet plenum chamber 55 is formed within the shroud support skirt 53 and between the bottom grid plate 35 and the bottom head 13 of the vessel.

A plurality of upright jet pumps 58 are mounted in the downcomer annulus between the shroud and the vessel. The jet pumps are identical so only one is described in detail. Each jet pump includes an elongated vertical hollow body 59 which includes an inlet or suction entrance 60 at its upper end. As shown in FIGS. 1, 2B, 3 and 5, the suction entrance converges downwardly into a straight cylindrical throat or mixing chamber 62, which merges at its lower end into an outwardly diverging diffuser 63. The suction entrance, throat, and upper portion of the diffuser are welded together to form an integral unit. The lower end of this unit makes a slip fit into a circular fitting 64 secured to the upper part of the lower portion of the diffuser. The upper end 65 of the fitting 64 tapers outwardly to facilitate inserting the lower end of the slip joint into it.

An O-ring 66, which may be optional, makes a seal between the lower end of the upper portion of the diffuser and an inwardly extending annular shoulder 67 in the intermediate part of the fitting 64.

Referring to FIGS. 2B and 3, a horizontal external spacer ring 68 is welded to the upper portion of the throat and makes a slip fit in a vertical opening 69 in an outwardly extending annular shelf 70 welded to the exterior of the shroud. Thus, the suction entrance, throat, and upper part of the diffuser of each pump can be removed by simply lifting this assembly of elements from the fitting 64. A new assembly of those parts is easily fitted into place by guiding it down through its respective opening in the shelf.

The lower end of the diffuser fits into a turning elbow connection 71 which is welded to an inlet opening 72 in the shroud skirt, so that water discharged from the pump is forced through the skirt, into the core inlet plenum chamber, past the control rod guide tubes, and up the channels in the fuel assemblies.

A separate jet pump nozzle 73 is secured at the suction entrance of each jet pump to direct a jet of high-velocity driving fluid or water into the suction inlet. The internal diameter of the nozzle is reduced at 74 so that the water velocity increases with a corresponding decrease in pressure. This reduction in pressure causes driven fluid or water to be sucked from the downcomer annulus into the suction entrance of the pump where it is mixed with the high-velocity jet in the throat or mixing section. The driving and driven fluids are substantially cimpletely mixed by the time they reach the upper end of the diffuser, and they begin to reduce in speed and increase in static pressure as they move out the diffuser and into the shroud skirt.

Figure 5:
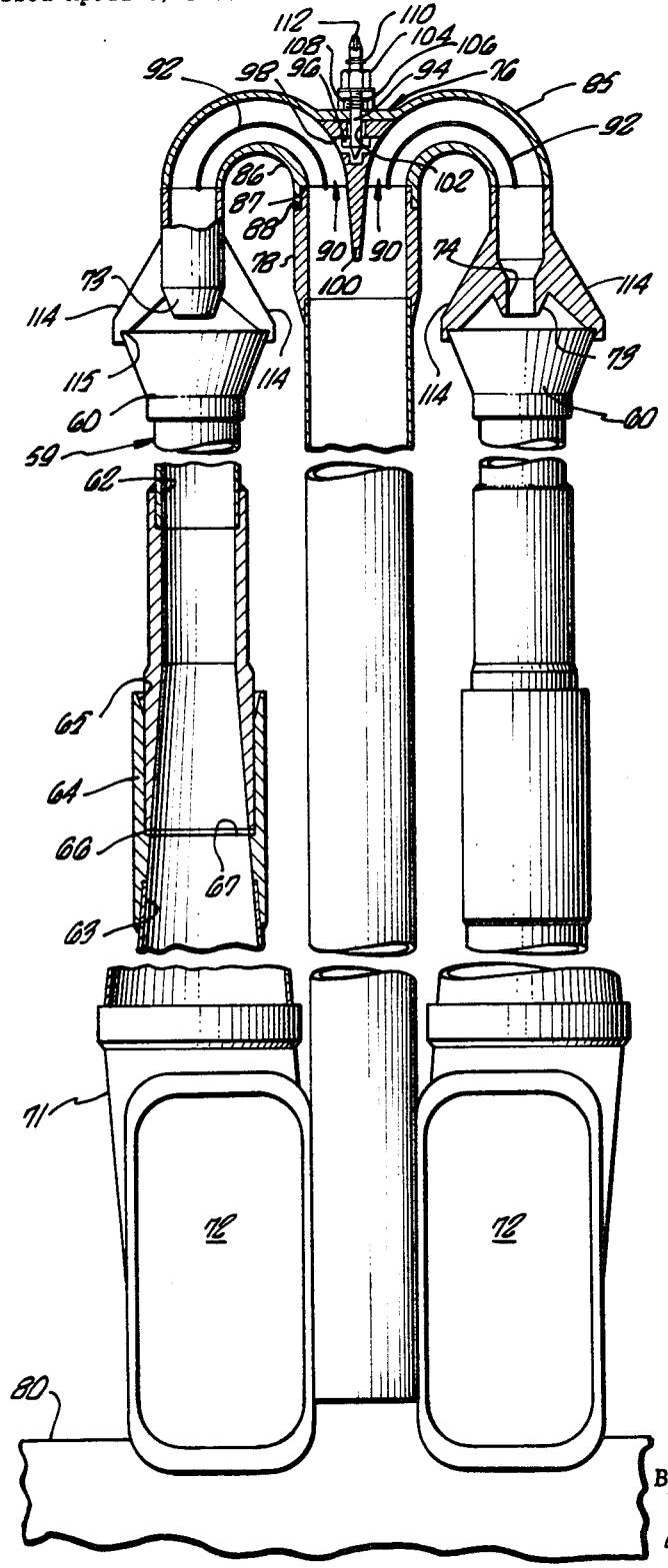
FIG. 5 is a fragmentary view, partly broken away, taken within the area of line 5—5 of FIG. 2B.

Preferably, the jet pump nozzles are formed in pairs, shown best in FIG. 5. Each nozzle in a pair extends outwardly and downwardly from a special casting 76 which makes a fluid-tight fit on the upper end of a vertical riser or supply pipe 78 welded at its lower end to the upper side of a hollow arcuate distributor or manifold 80. Although only one distributor is shown in the drawings, the pump risers are preferably served by a pair of hollow arcuate distribution manifolds identical in size and shape. Each manifold extends through an arc of about 150° and is supplied water under pressure from a separate conventional recirculation pump 81 through an inlet 82.

As shown best in FIG. 2B, the distributor manifold is secured to the vessel at inlet 82 closely adjacent the location where the shroud skirt is secured to the vessel. This results in the risers and jet pump bodies, which are secured to the shroud skirt, being substantially the same effective length to minimize the problems of thermal expansion and contraction as the equipment is heated and cooled. Each distributor is supported along its length by support pads 83 secured to the interior of the pressure vessel. The pads have upper bearing surfaces 84 which allow for thermal expansion in the horizontal plane.

Returning to the nozzles, the special casting to which they are secured includes a circular elbow dome 85 which overlies a circular neck 86 that has an inwardly stepped annular shoulder 87 that makes a snug pressure-tight fit with an outwardly stepped annular shoulder 88 on the upper end of the riser. Two separate U-shaped flow channels 90 extend in opposite directions from the neck 86 and each terminates at a respective nozzle. Each flow channel 90 is divided longitudinally by a U-shaped vane 92 concentrically disposed in a respective flow channel and formed integrally with the casting 76 to reduce pressure loss in the liquid changing direction 180° in passing from the riser into the nozzle.

The casting 76 is held in the position shown in FIG. 5 by a vertical inverted bolt 94 with a T-head 96 on its lower end and making a lock fit in a lower horizontal recess 98 in a transverse web 100 formed integrally across the upper end of the riser.

An upper or entrance horizontal recess 102 in the web and located above and extending transversely to the lower recess 98 permits the T-head 96 of the bolt 94 to be located in the lower recess 98 and turned to the locked-down position shown in FIG. 2B to be prevented from withdrawal. A nut 104 is threaded down on the bolt 94 against the upper end of a downwardly opening retainer cup 106 which confines a compression spring 108 against the top of the special casting 76. The spring prevents the nut 104 from vibrating loose. A retainer ring 110 on the bolt above the nut prevents the nut from being removed completely from the bolt. The upper end of the bolt is tapered and provided with a slot 112 to receive a tool (not shown) which permits the bolt shank 94 to be turned by remote control and release the head 96 from the recess 98 when the castings and nozzles are to be removed and replaced.

Each nozzle has three downwardly and outwardly extending wings 114, spaced at 120° intervals, with downwardly opening notches 115 at their lower ends to make a snug fit around the suction inlet of the pump, and to make a slightly loose fit at room temperature in an axial direction against the upper edge of the suction inlet when the special casting is bolted tightly against the upper end of the riser.

The pump body is made of a chrome-nickel steel, such as Type 304 stainless steel. It has a slightly greater thermal coefficient of expansion than the riser, which is made of a nickel base alloy material such as Inconel. Both of these are corrosion-resistant materials suitable for high-purity water service. The pumps are assembled at room temperature, and when they are heated to their normal operating temperatures, their bodies expand longitudinally slightly more than do the risers, causing the suction entrance of each pump to make a tight fit into the notches of the wings on the nozzles. This holds the pump firmly together at the slip joint, and insures accurate alignment of the nozzles under all operating conditions so that the pump efficiency does not decrease due to vibration or thermal cycling.

Water is supplied from the downcomer annulus to each of the recirculation pumps through a respective outlet 116 located below the pump nozzles and just above the distribution manifolds. Only one recirculating pump outlet is shown, although two are usually used, there being one for each recirculation pump which, in turn, supplies water to a respective distributor manifold.

Other pairs of metals which can be used in the pump body and riser, respectively, may be selected from handbook data using the following relationship:

$\alpha_1$=coefficient of linear expansion of the jet pump body material, inches/inch/° F.

$\Delta T$=temperature rise of the system from the ambient to the hot operating conditions, ° F.

$L_1$=length of the jet pump body from its fixed lower end to the top of the inlet section, inches $\alpha_2$=coefficient of linear expansion of the riser material, inches/inch/° F.

$L_2$=length of the riser from its fixed end at the distributor to its upper end The differential expansion length, $\Delta$ (inches), between the riser and pump at the hot operating conditions is calculated as:

$$\Delta = \Delta T(\alpha_1 L_1 - \alpha_2 L_2)$$

The differential expansion length, $\Delta$, is adjusted during design by the selection of materials with relative thermal expansion characteristics ($\alpha$) and the component lengths $L_1$ and $L_2$. When properly designed, the value $\Delta$ is positive and of such magnitude to close the spacing and make a tight fit between the nozzle wings 114 (FIG. 5) and the pump suction inlet when the system is brought from the ambient to hot operating condition. When the component lengths, $L_1$ and $L_2$, are approximately equal, $\alpha_1$ must be greater than $\alpha_2$ for proper functioning.

Although the dimensions are not entirely critical, they do have a bearing on the initial tolerance at assembly temperature between the nozzle wings and the respective shoulder on which they rest, as well as on the difference in coefficients of thermal expansion of the two metals.

About one-third of the water flowing through the reactor core is circulated exterior of the vessel through the recirculation pumps and back to the nozzles of the jet pumps. The remaining two-thirds of the water passing through the core is forced through jet pumps without having to leave the pressure vessel. This reduces heat losses from the coolant recirculation piping and requires considerably less coolant circulation equipment located outside the pressure vessel.

The location of the pump recirculation outlets below the jet pump nozzles creates a general downward flow in the downcomer annulus and improves the operating efficiency of the jet pumps. Moreover, the location of the distributors below the recirculation outlets places them out of the flow of fluid and further improves pumping efficiency.

In operation, the recirculating pumps are turned on to activate the jet pumps which drive water into the shroud skirt and up through the reactor core which, in effect, has a channel with an inlet at its lower end and an outlet at its upper end for the flow of fluid coolant through it. The control rods are set to provide the required fission rate in the reactor core, and water passing through the reactor core is vaporized to a mixture of steam and water, which is separated at the steam separators. Water is returned to the downcomer annulus. Steam passes the drying panels for power use and is then condensed and returned to the downcomer annulus.

The water passing through the reactor core flows down past the jet pump nozzles and out the recirculation pump outlet to the recirculation pump, where it is increased in pressure and returned to the distribution manifolds. Water under high pressure flows through the risers and jets as a driving stream from the nozzles into the suction entrances of the jet pumps. Water is drawn into the entrance of the jet pumps as driven fluid and forced under pressure into the shroud skirt and up through the reactor core.

The operation is continued until the pumps need maintenance. For example, the flow rate of liquid through the nozzles and throat sections of the pumps is relatively high, so that these sections tend to wear first, and they are easily replaced when the reactor is refueled.

With the design of this invention, it is a fairly simple matter to replace the nozzles and throats remotely, easily, and safely. The reaction of the reactor core is reduced below critical, and pressure is vented from the vessel. The top head of the vessel is removed, and a suitable tool (not shown) is lowered in the water to loosen the nut 104 on each of the jet pump nozzle castings. When the nuts are sufficiently loosened, a special tool is inserted into slot 112 of the bolt shank 94 and rotated to free the bolt from the recess 98 in the web of the riser tube. The casting and each pair of nozzles attached to it are now free to be lifted from the riser. The upper portion of each pump requiring replacement is lifted by a suitable retrieving tool (not shown) to slip the upper portion of the diffuser out of its slip joint so that the suction entrance, throat, and upper portion of the diffuser of a pump can be replaced by reversing the above-described procedure. After the necessary replacements are made, the equipment is operated as previously described.

The advantages of the pump and assembly of this invention are:

1. A relatively large distributor manifold can be used without interfering with the flow of fluid within the vessel, without interfering with the replacement of jet pump parts, and without having to be removed for such replacement. In fact, the distributor manifold can be made a permanent part of the vessel.

2. Only two inlet and outlet penetrations in the pressure vessel are required for the forced circulation of water, and this number can be reduced if desired by using only one distributor instead of two.

3. The jet nozzles and upper portions of the jet pump bodies are readily replaceable.

4. The nozzles are supported off the jet pump suction entrance of each pump to assure accurate alignment whether hot or cold.

5. The downcomer annulus above the nozzles and pumps is unobstructed, which not only facilitates repair and replacement, but provides for virtually unlimited expansion space upwardly for installation of improved pumps as they become available.

6. Thermal expansion problems are minimized by reducing to a minimum the distance between the point where the core shroud and the distributor manifold are attached to the vessel.

I claim:

1. A jet pump assembly comprising a pressure vessel for holding a fluid to be pumped, an elongated pump body disposed in the vessel and having an inlet and an outlet, an elongated supply pipe disposed in the vessel alongside the pump body and extending beyond the pump inlet, the end of the supply pipe extending beyond the pump body having about a 180° bend in it, a nozzle connected to the end of the supply pipe extending beyond the pump inlet, the nozzle being disposed to direct a jet of driving fluid into the pump inlet, and wings on the nozzle and engaging the pump inlet to restrict relative movement between the nozzle and pump inlet during operation of the pump, the pump body and supply pipe being constructed and arranged relative to each other and the vessel that as they heat up the pump body tends to expand more along its longitudinal axis than the supply pipe and urge the wings on the nozzle against the pump inlet.

2. A jet pump assembly comprising a pressure vessel for holding a fluid to be pumped, an elongated pump body disposed in the vessel and having an inlet and an outlet, the pump body including a first hollow section with an opening through it, a second hollow section with an opening through it, and slip joint means on adjacent ends of the section so they can be slipped together and slipped apart, an elongated supply pipe disposed in the vessel alongside the pump body and extending beyond the pump inlet, the end of the supply pipe extending beyond the pump body having about a 180° bend in it, a nozzle connected to the end of the supply pipe extending beyond the pump inlet, the nozzle being disposed to direct a jet of driving fluid into the pump inlet, wings on the nozzle and engaging the pump inlet to restrict relative movement between the nozzle and pump inlet during operation of the pump, the pump body and supply pipe being constructed and arranged relative to each other and the vessel that as they heat up the pump body tends to expand more along its longitudinal axis than the supply pipe and urge the wings on the nozzle against the pump inlet.

3. A jet pump assembly comprising a pressure vessel for holding a fluid to be pumped, an elongated pump body disposed in the vessel and having an inlet and an outlet, an elongated supply pipe disposed in the vessel alongside the pump body and extending beyond the pump inlet, the end of the supply pipe extending beyond the pump body having about a 180° bend in it, a nozzle connected to the end of the supply pipe extending beyond the pump inlet, the nozzle being disposed to direct a jet of driving fluid into the pump inlet, and wings on the nozzle and engaging the pump inlet to restrict relative movement between the nozzle and the pump inlet during operation of the pump, means connecting the pump body and supply pipe to the tank at about the same location so they are substantially equal in effective length, the pump body having a higher thermal coefficient of expansion so it expands longitudinally on heating more than the supply pipe and urges the wings and pump inlet firmly together.

4. A jet pump assembly comprising a pressure vessel for holding a fluid to be pumped, an elongated pump body disposed in the vessel and having an inlet and an outlet, the pump body including a first hollow section with an opening through it, a second hollow section with an opening through it, and slip joint means on adjacent ends of the section so they can be slipped together and slipped apart, an elongated supply pipe disposed in the vessel alongside the pump body and extending beyond the pump inlet, the end of the supply pipe extending beyond the pump body having about a 180° bend in it, a nozzle connected to the end of the supply pipe extending beyond the pump inlet, the nozzle being disposed to direct a jet of driving fluid into the pump inlet, and wings on the nozzle and engaging the pump inlet to restrict relative movement between the nozzle and the pump inlet during operation of the pump, means connecting the pump body and supply pipe to the tank at about the same location so they are substantially equal in effective length, the pump body having a higher thermal coefficient of expansion so it expands longitudinally on heating more than the supply pipe and urges the wings and pump inlet firmly together.

5. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a jet pump inlet, a nozzle mounted to direct a jet of driving fluid into the jet pump inlet, a distributor spaced from the nozzle in a direction toward the core inlet, a supply riser connected to the distributor and nozzle, the supply riser making about a 180° bend from the distributor to the nozzle, the supply riser and jet pump body being about the same length, the jet pump body having a higher thermal coefficient of expansion than the supply riser, and means for delivering fluid to the distributor and nozzle under pressure.

6. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a jet pump inlet, a nozzle mounted to direct a jet of driving fluid into the jet pump inlet, wings on the nozzle engaging the pump inlet to restrict relative movement between the nozzle and pump inlet, a distributor spaced from the nozzle in a direction toward the core inlet, a supply riser connected to the distributor and nozzle, the supply riser making about a 180° bend from the distributor to the nozzle, the supply riser and jet pump body being about the same length, the jet pump body having a higher thermal coefficient of expansion than the supply riser so that as temperature increases the pump body expands more than the riser and forces the wings against the pump inlet, and means for delivering fluid to the distributor and nozzle under pressure.

7. Heat generating reactor apparatus comprising a nuclear chain reacting core having an inlet and an outlet through which a fluid coolant flows to be heated, a jet pump body having a discharge opening into the core inlet, the pump body extending toward the core outlet and terminating at a jet pump inlet, the pump body including a first hollow section with an opening through it, a second hollow section with an opening through it, and slip joint means on adjacent ends of the section so they can be slipped together and slipped apart, a nozzle mounted to direct a jet of driving fluid into the jet pump inlet, wings on the nozzle and engaging the pump inlet to restrict relative movement between the nozzle and pump inlet, a distributor spaced from the nozzle in a direction toward the core inlet, a supply riser connected to the distributor and nozzle, the supply riser making about a 180° bend from the distributor to the nozzle, the supply riser and jet pump body being about the same length, the jet pump body having a higher thermal coefficient of expansion than the supply riser so that as temperature increases the pump body expands more than the riser to force the slip joint together and to force the nozzle wings against the pump inlet, and means for delivering fluid to the distributor and nozzle under pressure.

References Cited

UNITED STATES PATENTS

| | | | |
|---|---|---|---|
| 2,861,033 | 11/1958 | Treshow | 176—75 X |
| 3,087,881 | 4/1963 | Treshow | 176—61 |
| 3,202,584 | 8/1965 | Bogaardt et al. | 176—61 |
| 3,231,474 | 1/1966 | Jones et al. | 176—61 |
| 3,274,065 | 9/1966 | Kierulf et al. | 176—61 |

FOREIGN PATENTS 643,116  9/1950  Great Britain.

OTHER REFERENCES

Germany Printed Application 1,124,527 KI 17f 5/09 March 1962.

Hicks, T. G.: Pump Selection and Application, McGraw-Hill Book Co., N.Y., 1957, pp. 340, 341.

REUBEN EPSTEIN, *Primary Examiner.*